United States Patent
Nelson

[11] Patent Number: 5,926,998
[45] Date of Patent: Jul. 27, 1999

[54] BUOYANCY DEVICE

[76] Inventor: Mellin G. Nelson, 23-J Rice St., Danvers, Mass. 01923

[21] Appl. No.: 08/918,151

[22] Filed: Aug. 25, 1997

[51] Int. Cl.[6] .......................... A01K 61/00; A01K 71/00; A01K 69/08
[52] U.S. Cl. ................................................ 43/102; 43/100
[58] Field of Search ........................... 43/100, 102, 103; 114/121, 295, 297; 441/21, 28, 29

[56] References Cited

U.S. PATENT DOCUMENTS

| | | | |
|---|---|---|---|
| 1,761,365 | 3/1930 | Reed . | |
| 3,426,472 | 2/1969 | Richard . | |
| 3,852,908 | 12/1974 | Christopher | 43/102 |
| 4,034,693 | 7/1977 | Challenger | 43/102 |
| 4,092,944 | 6/1978 | Van Der Wal | 114/297 |
| 4,244,323 | 1/1981 | Morimura | 43/102 |
| 4,507,093 | 3/1985 | Norvell | 43/102 |
| 4,831,774 | 5/1989 | Gonzalez | 43/102 |
| 4,860,487 | 8/1989 | Kingston | 43/102 |

*Primary Examiner*—Kurt Rowan
*Attorney, Agent, or Firm*—Don Halgren

[57] ABSTRACT

The present invention comprises a buoyancy device for the self-controlled maintenance of desired vertical upright orientation of a marine structure during its descent and settlement onto a water bed floor. The device includes a chamber for enclosing a volume of air, the chamber defined by an arrangement of walls. Those chamber walls include a first or upper portion and a second or lower portion. The device has ports arranged in the walls in upper portion of the chamber, to permit entry of water and/or escape of air from the chamber during any descent of the device as it descends in a water environment attached to a marine structure. A port with an engagable plug is movably arranged in the lower portion of the chamber, to prevent entry of water through the drain opening during descent, and to permit drainage of water from the chamber during ascent of the marine structure from the water.

6 Claims, 1 Drawing Sheet

BUOYANCY DEVICE

BACKGROUND OF THE INVENTION

1. Field of the Invention

This invention relates to buoyancy devices and more particularly to devices for keeping submersible structures properly oriented during their descent into the water depths.

2. Prior Art

The placement and proper orientation of small structures to be submerged under water, is very difficult. For example, a structure such as a lobster trap, which is typically dropped from a moving lobster boat, connected to one or more other lobster traps by a tether or line, sink to the bottom relatively swiftly. These lobster traps which are made either of wood or steel wire, typically have some sort of weight to give the lobster traps directionality in their descent, and to help stabilize them on the floor or bed of the body of water in which they reside.

Nonetheless, as many as 30% of any group of lobster traps being distributed on the seabed, may settle in an undesired position such as an upside-down orientation. This may prevent the entry of any lobster or crab into the trap because the entry port may be blocked or occluded.

One attempt in the field to rectify this situation, is shown in U.S. Pat. No. 1,761,365 to Reed wherein a fish net hoist is shown with a plurality of chambers attached thereto. Several of the chambers are sealed and the lower chambers are arranged so that the air may displaced by water to help the net sink, and the water may be displaced by compressed air to help the fish net float.

A further U.S. Pat. No. 3,426,472 to Richard discloses a delayed release device which comprises a buoy or balloon which is tethered to a lobster trap; the buoy having an expendable linkage which corrodes to permit the buoy to rise to the surface and disclose the location of the lobster trap. The buoy in this device, probably inadvertently maintains the correct orientation of the lobster trap when it is on the sea floor.

In reality, no prior art device has been shown which is inexpensive to manufacture, easy to use, and automatic in its operation, and which also permits the strong likelihood of proper structure/trap orientation on the sea bed floor.

It is therefore an object of the present invention, to provide a buoyancy device which will permit submersible marine structures to be properly oriented as they descend in a marine environment.

It is an object of the present invention, to provide a buoyancy device, which will overcome the disadvantages of the prior art.

It is a further object of the present invention, to provide a buoyancy device, which is simple to operate, inexpensive to manufacture, and is self-functioning, minimizing labor needs.

It is yet a further object of the present invention, to proved a buoyancy device for keeping marine structures such as lobster/crab traps in an upright orientation as they settle to the sea floor, while permitting those traps to be piled one on top of another during delivery to the desired site, for ease of distribution off of a lobster boat.

BRIEF SUMMARY OF THE INVENTION

The present invention relates to a buoyancy device for the maintenance of the proper orientation of a submersible marine structure, during its descent to a sea bed floor. Such a structure may be a lobster trap or a crab trap. The buoyancy device comprises a chamber, of generally cylindrical configuration. The cylindrically shaped chamber has a first end and a second end which are each sealed by a wall. The chamber has an upper side which is defined by at least, a first inlet port and a second inlet port. Each inlet port is preferably about 0.06 to about 0.15 inches in diameter. A first and a second platform boss are arranged on the outer surface of the cylindrically shaped chamber immediately adjacent their first and second inlet ports. Each boss has a planar surface. The bosses permit the buoyancy device to be attached to marine structure in a stable manner, as by tying or clamping.

The buoyancy device also has a lowermost side which is defined by at least one drainage or discharge port. The discharge port is preferably at least about 0.25 inches in diameter. A buoyant discharge port plug is arranged in the discharge port opening. The plug in a preferred embodiment, has a generally longitudinal axis, an upper end of which has a "T" cap thereon. The plug has a tapered body, the narrow end of which is attached to the "T" cap. The wide end of the tapered body is unitary with a second larger "end" cap of somewhat cylindrical configuration thereon. The plug is preferably made from a polypropylene or other material, which would normally float and/or itself have buoyancy.

In operation of the buoyancy device, the uppermost side edge of the chamber is attached preferably to the inside of the upper wall of the marine structure, i.e. a lobster trap, so that the upper side of the chamber is directed upwardly. By attaching the buoyancy device on the inside wall of the upper wall of a lobster trap, this permits the lobster traps, which are typically tethered to one another, to be piled or stacked upon one another as they are being hauled out to their location on the water, although, the inventive device may be placed on the outside of a trap, the upper side of the device being required to be directed upwardly. As the successive lobster traps are dropped from the lobster boat, and they begin their descent in to the water, the water is permitted to slowly enter into the chamber through the plurality of inlet holes along the top or upper side of the chamber in a manner slowly enough, to keep the lobster trap in an upright orientation. The chambers thus provide buoyancy sufficient to "right the trap". During the descent, as the water pressure builds up, the air within the chamber is permitted to be discharged out through at least one of the inlet ports on the upper side thereof. The discharge port plug loosely fits into the bottom drain hole, and the upper "T" cap merely serves to keep the plug from falling out of the buoyancy device. The cylindrically shaped lower "end" cap, since it is made out of floatable or buoyant material, exerts a slight pressure onto the drain hole on the bottom side of the chamber, to prevent water from rushing in through the drain hole, as the lobster trap is descending into the water.

The slow release of the air through one of the upper ports, and its replacement by water in through one of the upper ports, (depending on how the chamber is slightly tilted), as the buoyancy chamber submerges to greater depths, maintains the general uprightness and alignment of the marine structure as it descends to the bottom. When the marine structure, i.e., the trap, is being raised, the drain plug drops away from any snug engagement with the drain port as the lobster trap is pulled from the water, to permit the water inside of the chamber to readily and automatically drain out. The buoyancy device is thus self-draining as soon as the marine structure, or lobster trap is being removed from the water. Thus the buoyancy chamber is self-operable and requires no attention from the lobsterman or attendant.

Thus, what has been shown is a unique buoyancy device for a marine structure such as a lobster trap, which is readily attachable to the inside or to the outside of that structure, to permit that structure to have a slow, properly oriented descent to the water's bottom.

It is to be noted that the number of inlet holes and/or outlet holes, and/or their dimensions, may be varied, depending on the likely depth of the water in which the marine structure is to be submerged. The buoyancy device may be made out of any material, however, polymer materials such as polypropylene are preferred. The diameter of such a chamber is preferably within the range between 1.5 inches to 3 inches, and its length is within the range of approximately 8 inches to 16 inches long, for a typical lobster trap as utilized in the industry, although the chamber could be of any likely shape providing that it had an upper side for the inlet ports and a lower side portion for a drainage port.

The invention thus comprises a buoyancy device for the self-controlled maintenance of desired vertical upright orientation of a marine structure during its descent and settlement onto a water bed floor. The device includes a chamber for enclosing a volume of air, the chamber having an arrangement of walls, the walls of the chamber having a first or upper portion and a second or lower portion, and means arranged in the upper portion walls of the chamber, to permit entry of water and/or escape of air from the chamber during any descent of the device as it descends in a water environment attached to a marine structure; and means arranged in the lower portion walls of the chamber, to permit discharge of water from the chamber during ascent from a water environment, while the chamber is attached to a marine structure. The means arranged in the upper portion walls of the chamber permits entry of water into the chamber and/or escape of air from the chamber, and comprises at least one inlet port disposed through the upper wall portion.

The means arranged in the lower portion walls of the chamber to permit escape of water from the chamber comprises at least one outlet/discharge port disposed through the lower portion of the chamber wall. A buoyant plug is arranged in the inlet port in the lower wall portion of the chamber, for permitting escape of water during ascent of the chamber within the structure, as it is pulled from the water. The plug has an upper end with a "T" cap thereon to tether the plug to the chamber and prevent its loss therefrom. The plug has a lower end with an end cap thereon to push the plug against the lower inlet port in the lower side portion wall of the chamber and seal that port as the chamber and marine structure are descending to the water bed floor. The plug has a central body portion of tapered configuration, to permit the mating and minimal blocking of the lower inlet port in the chamber. The inlet port may have a diameter of about 0.06 to about 0.15 inches. The outlet port has a diameter of about 0.25 to about 0.50 inches. The plug is preferably made of a buoyant material such as polypropylene.

The invention also includes a method of controlling directional orientation of a marine structure during its descent onto the bed of body of water, comprising the steps of: attaching a walled chamber enclosure to an upper side of said structure; placing at least one inlet/outlet port through an upper side wall portion of the chamber; placing at least one outlet port through a lower side wall portion of the chamber; capturing a movable floatable plug in the outlet port, to permit escape of water into and from the chamber during its ascent from the bed of a body of water.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figure 1:
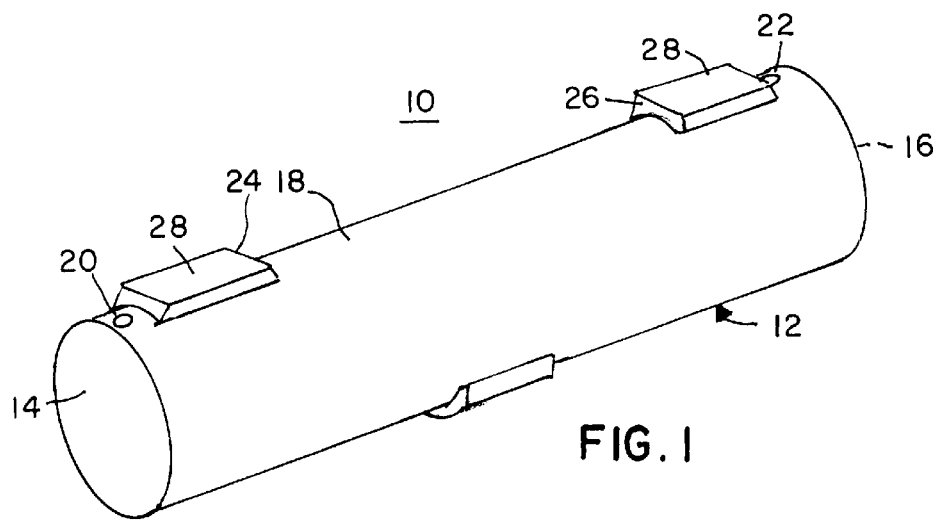
FIG. 1 is a perspective view of a buoyancy device constructed according to the principles of the present invention.
Figure 2:
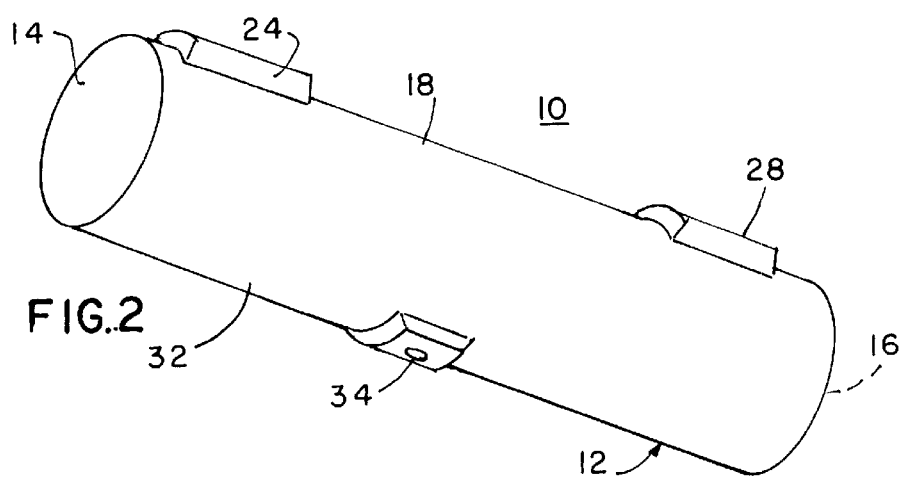
FIG. 2 is a perspective view similar to that of FIG. 1, shown from a lower point of view.
Figure 3:
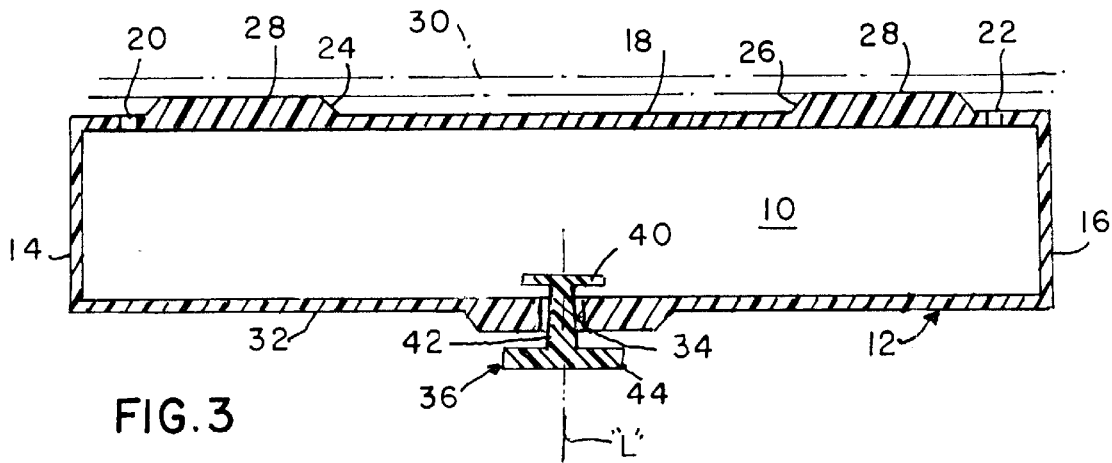
FIG. 3 is a side elevational view, in section, of the buoyancy device, attached to the sidewall of a marine structure.

Referring to the drawings in detail, and particularly to FIG. 1, there is shown the present invention comprising a buoyancy device 10 for the maintenance of the proper orientation of a submersible marine structure, during its descent to a sea bed floor. Such a structure may be a lobster trap or a crab trap 11, a portion of which is shown in FIG. 3. The buoyancy device 10 comprises an enclosure or chamber 12, preferably of generally cylindrical configuration. The cylindrically shaped chamber 12 has a sealed first end wall 14 and a sealed second end wall 16. The chamber 12 has a first or upper side portion 18 which is defined by at least, a first inlet port 20 and a second inlet port 22. Each inlet port 20 and 22 is in the range of preferably about 0.06 to about 0.15 inches in diameter. A first and a second platform boss 24 and 26 are arranged on the outer surface of the cylindrically shaped chamber 12 preferably closely adjacent their first and second inlet ports 20 and 22. Each boss 24 and 26 has an outwardly directed planar surface 28. The flat surfaces 28 of the bosses 24 and 26 permit the buoyancy device 10 to be attached to a wall 30 of the marine structure 11, as shown in FIG. 3, in a stable manner, as by tying or clamping, which attachment arrangement is not shown for clarity of viewing.

The buoyancy device 10 also has a second or lowermost side portion 32 which is defined by at least one drainage or discharge port 34. The discharge port 34 is a circular opening through the lower wall portion of the chamber 12, and is preferably for example, at least about 0.25 to about 0.50 inches in diameter. A buoyant discharge port plug 36 is arranged in the discharge port opening 34 for sealing thereof during descent to the waters bottom. The plug 36 in its preferred embodiment, has a generally longitudinal axis "L", a first or upper end of which has a "T" cap 40 thereon. The plug 36 has a tapered central body portion 42, the narrow end of which is attached to the "T" cap 40. The wide end of the tapered body portion 42 is unitary with a second generally cylindrically shaped end cap 44, on the second or lower end of that body portion 42. The plug 36 is preferably made from a polypropylene or other material, which would normally float and/or itself have buoyancy. It is to be noted that the plug could be of other shape, as long as it sealed the drain port during descent of the chamber, and come automatically "unsealed" during removal of the trap from the water.

In operation of the buoyancy device 10, the uppermost side portion 18 of the chamber 12 is attached preferably to the inside of the upper wall 30 of the marine structure 11, i.e. a lobster trap, so that the upper side portion 18 of the chamber 12 is directed upwardly, as shown in FIG. 3. By attaching a buoyancy device 10 on the "inside" portion of the upper wall of a lobster trap, the lobster traps, which are typically tethered to one another, are permitted to be piled or stacked upon one another as they are being hauled out to their location on the water, although, the inventive device 10 may be lower wall portion of the chamber 12, and is preferably for example, at least about 0.25 to about 0.50 inches in diameter. A buoyant discharge port plug 36 is arranged in the discharge port opening 34 for sealing thereof during descent to the waters bottom. The plug 36 in its preferred embodiment, has a generally longitudinal axis "L", a first or upper end of which has a "T" cap 40 thereon. The plug 36 has a tapered central body portion 42, the narrow end of which is attached to the "T" cap 40. The wide end of the tapered body portion 42 is unitary with a second generally cylindrically shaped end cap 44, on the second or lower end of that body portion 42. The plug 36 is preferably made from a polypropylene or other material, which would normally float and/or itself have buoyancy. It is to be noted that the plug could be of other shape, as long as it sealed the drain port during descent of the chamber, and come automatically "unsealed" during removal of the trap from the water.

In operation of the buoyancy device 10, the uppermost side portion 18 of the chamber 12 is attached preferably to the inside of the upper wall 30 of the marine structure 11, i.e. a lobster trap, so that the upper side portion 18 of the chamber 12 is directed upwardly, as shown in FIG. 3. By attaching a buoyancy device 10 on the "inside" portion of the upper wall of a lobster trap, the lobster traps, which are typically tethered to one another, are permitted to be piled or stacked upon one another as they are being hauled out to their location on the water, although, the inventive device 10 may be placed on the outside of a trap 11, the upper side of the device being required to be arranged to be on the upwardly desired side of the structure 11.

As the successive lobster traps are dropped from the lobster boat, and they begin their descent in to the water, the water is permitted to slowly enter into the chamber 12, at least through one of the plurality of inlet holes 20 and 22 along the top or upper portion 18 of the chamber 12, the water entering in a manner slowly enough, to keep the lobster trap 11 in an upright orientation during its descent. The chambers 12 (preferably one per trap 11) thus provide buoyancy sufficient to "right the trap". During the descent, as the water pressure builds up, the air within the chamber 12 is permitted to be discharged out through at least one of the inlet ports 20 and 22 on the upper side portion 18 thereof (depending on how the chamber 12 is tilted). The drain plug 36 loosely fits into the bottom drain hole 34, and the upper "T" cap 40 merely serves to keep the plug 36 from falling out of the buoyancy device 10. The lower end cap 44, since it is made out of floatable or buoyant material, exerts a slight pressure onto the drain hole 34 on the bottom side of the chamber 12, to prevent water to rush into the chamber 12 as the lobster trap 11 is descending into the water.

The slow release of the air through one of the upper ports, and its slow replacement by water in the chamber 12, as the buoyancy chamber 12 (and trap 11) submerges to greater depths, maintains the uprightness and general upright alignment of the marine structure 11 as it descends to the bottom. When the marine structure 11, i.e., the trap, is being raised, the loose fitting plug 36 drops away from any snug engagement with the drain port 34, as the lobster trap 11 is pulled from the water, to permit the water inside of the chamber 10 to readily and automatically drain out. The buoyancy device 10 is thus self-draining as soon as the marine structure, or lobster trap is being removed from the water. Thus the buoyancy chamber is self-operable and requires no attention from the lobsterman or attendant.

Thus, what has been shown is a unique buoyancy device for a marine structure such as a lobster trap, which is readily attachable to the inside or to the outside of that structure, to permit that structure to have a slow, properly oriented descent to the water's bottom.

It is to be noted that the number of inlet holes and/or outlet holes, and/or their dimensions, may be varied, depending on the likely depth of the water in which the marine structure is to be submerged. The chambers, may be made out of any material, however, polymer materials such as polypropylene are preferred. The diameter of such a chamber is preferably within the range between 1.5 inches to 3 inches, and its length is within the range of approximately 8 inches to 16 inches long.

I claim:

1. A buoyancy device for the self-controlled maintenance of desired vertical upright orientation of a marine structure during its descent and settlement onto a water bed floor, comprising:

a buoyancy chamber for enclosing a volume of air, said chamber having an arrangement of walls;

said arrangement of walls of said chamber having a first or upper portion and a second or lower portion;

an upper port arranged in said upper portion of said chamber, to permit entry of water and/or escape of air from said chamber during any descent of said device as it descends in a water environment attached to a marine structure; and a lower port and a buoyant plug displacably arranged in said lower port in said lower portion of said chamber, to permit discharge of water from said chamber through said lower port during ascent of said chamber and marine structure from a water environment;

wherein said lower port arranged in said lower portion of said chamber to permit escape of water from said chamber comprises at least one outlet port disposed through said lower portion of said wall;

wherein said buoyant plug is arranged in said outlet port in said lower wall portion, for slowing the entry of water into said chamber during descent and for permitting escape of water during ascent of said chamber and structure from the water;

wherein said plug has a lower end with an end cap thereon to push said plug against said lower inlet port in said lower side portion of said chamber; and wherein said plug has a central body portion of tapered configuration, to permit the sealing mating of said plug in said lower inlet port in said chamber.

2. The buoyancy device as recited in claim 1, wherein said upper port arranged in said upper portion of said chamber to permit entry of water into said chamber and/or escape of air from said chamber comprises at least one inlet port disposed through said upper portion of said wall.

3. The buoyancy device as recited in claim 1, wherein said plug has an upper end with a "T" cap thereon to tether said plug to said chamber.

4. The buoyancy device as recited in claim 2, wherein said inlet port has a diameter of about 0.06 to about 0.15 inches.

5. The buoyancy device as recited in claim 1, wherein said outlet port has a diameter of about 0.25 to about 0.50 inches.

6. The buoyancy device as recited in claim 1, wherein said plug is made of a buoyant material.

* * * * *